Patented Feb. 10, 1953

2,628,249

UNITED STATES PATENT OFFICE 2,628,249

ESTERIFICATION PROCESS

Anthony J. Bruno, Jr., Pittsburgh, Pa., assignor to Pittsburgh Coke & Chemical Company, Pittsburgh, Pa., a corporation of Pennsylvania No Drawing. Application January 3, 1951, Serial No. 204,285

12 Claims. (Cl. 260—475)

This invention relates to new improvements in esterification processes and is particularly concerned with the production of discoloration-free esters of high molecular weight and low vapor pressure from the corresponding alcohol and acid.

FIELD OF INVENTION

Large quantities of esters are consumed each year as plasticizers in the formation of plastic compositions, coating compositions, films, filaments, and the like. One of the prime considerations given to any ester for use in such manner is the purity of the product, i. e., the lack of contaminating materials giving the product undesirable color characteristics or acidic or similar properties, which may cause the ester or the materials with which they are mixed to be unstable or cause the products to be unusable for many purposes. Accordingly, an extensive amount of work has been carried out in an effort to devise improvements in the existing procedures for ester production, so as to produce products having the highest possible degree of purity and freedom from discoloration.

In this regard, it has been known that certain materials, such as mineral acids, sulfonic acids, ion exchange resins, or the like, can be used as catalysts in esterifications. However, such materials, as the ion exchange resins, are costly and difficulty of recovery from the reaction mixture and bulkiness make them generally unattractive. On the other hand, the mineral acids and aryl sulfonic acids possess the disadvantage that they discolor the resulting esters. Although the such discolored ester can be rendered colorfree, the treatments required are most involved and quite costly. Consequently, the trade has been attempting for some time to find new and better esterification catalysts and methods which do not possess the detracting disadvantages referred to.

OBJECTS

A principal object of this invention is the provision of new improvements in esterification procedures, particularly, the methods used to form high molecular weight esters. Further objects include:

(1) The provision of new methods for forming plasticizer-type esters in very high yields, which are substantially free of discoloration and which possess an extremely high degree of purity.

(2) The provision of new catalysts for use in esterification reactions which may be employed in place of prior known esterification catalysts without causing discoloration of desired products, and (3) The provision of new esterification catalysts which increase the speed of reaction to such an extent that the tendency to produce color-forming bodies is greatly reduced.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

GENERAL DESCRIPTION

These objects are accomplished according to the present invention by the production of esters through the condensation of a carboxylic acid with an alcohol in liquid phase contact with a catalyst comprising a mixture of (1) a sulfur-containing acid from the group consisting of sulfuric and sulfonic acids, and (2) activated carbon. Sufficient of the catalytic mixture is used to have a catalytic effect upon the condensation of the alcohol and the acid.

The success of the present invention is due primarily to the unique discovery that a mixture of activated carbon with sulfuric acid or an aryl sulfonic acid can serve as a catalyst in esterification procedures and that, when this catalytic mixture is employed, the resulting esters possess unpredictably high degrees of purity and lack of discoloration and are obtained in surprisingly high yields. This is in contrast to the results obtained when the aryl sulfonic acids, sulfuric acid, or activated carbon per se are used as esterification catalysts which, in the case of the acids, result in the formation of discolored esters and which generally require longer periods of time for completion.

EXAMPLES

A more complete understanding of the procedures of this invention may be had by reference to the following illustrative examples of actual operations in accordance with the invention, wherein all parts are by weight.

Example I

This example illustrates the preparation of dibutyl phthalate.

200 parts of phthalic anhydride, 200 parts of butyl alcohol, one part of 95% sulfuric acid and 2.5 parts of activated carbon are charged into a suitable reaction vessel fitted with a reflux condenser, a reflux water separator, and an efficient stirrer. With the contents of the vessel thoroughly agitated, they are heated up to a controlled reflux temperature of 145° to 150° C. and retained there for five hours. During this period, water of reaction is removed and 90 parts of butyl alcohol are added in 10 part portions to compensate for loss of alcohol dissolved in the removed water.

At the end of five hours, the reflux condenser is shut off and the excess alcohol is allowed to distill off from the reaction vessel. The dibutyl phthalate contained in the reaction vessel is withdrawn and passed to a mixing vessel where sufficient caustic soda is added to just neutralize the free mineral acid. The ester is then washed with an excess of water, after which it is passed through filters and collected. It is then blown with steam to insure complete removal of volatiles, dried and filtered.

354 parts of dibutyl phthalate having the following specifications are obtained:

| | |
|---|---|
| Percent ester | 99.5% |
| Percent acid (as phthalic acid) | 0.003% |
| Color APHA scale | 10 to 15 |
| Specific gravity 20°/20° | 1.0474 |
| Percent water | 0.05 |
| Refractive index $n_D^{25}$ | 1.4910 |

*Example II*

The reaction of Example I is carried out in an identical manner, except that 50 parts of benzene are added to the reaction mixture as an azeotropic agent in order to effect a controlled temperature of 145° to 150° C. and obtain an efficient separation of water. The resulting product has the same specifications as the product of Example I.

*Example III*

The reaction of Example I is carried out in an identical manner, except that the activated carbon is omitted. The resulting ester has an APHA color of about 200.

*Example IV*

This example illustrates the preparation of di-2-ethylhexyl sebacate.

The following ingredients are charged into a reaction vessel equipped with stirrer, reflux condenser, and reflux water separator:

606 parts sebacic acid
859 parts 2-ethylhexanol
200 parts benzene
1.5 parts sulfuric acid (95%)
15 parts activated carbon The materials are heated to 125° to 130° C. with controlled reflux and simultaneous removal of condensed water. The reaction is carried out for six hours when refluxing is discontinued and the excess alcohol and benzene are allowed to distill off. Sufficient caustic soda is then added to neutralize free acid and the resulting ester is washed with water. The product is then blown with steam to completely remove volatiles, dryed and filtered. Without further treatment, 1190 parts of 2-ethylhexyl sebacate, having the following properties, are obtained:

| | |
|---|---|
| Percent ester | 99.3% |
| Percent acid (as sebacic acid) | 0.016% |
| Color APHA scale | 50 to 60 |
| Specific gravity 25°/25° | 0.9119 |
| Percent water | 0.083% |
| Refractive index $n_D^{25}$ | 1.4496 |

DETAILED DESCRIPTION

One of the important reactants for use in these new procedures is activated carbon which may be derived from a number of different sources. The exact form in which the activated carbon is used in the reaction is not critical, but most effective results are obtained when the carbon is used in an extremely finely divided form, e. g., a size where 85 to 95% will pass a 325 mesh standard sieve. Most activated carbons appear to be more or less generally useful for this purpose, but equally desirable results are not obtained with all activated carbons. It has been discovered that activated decolorizing carbons are most desirable.

The other component of the catalytic mixture for use with these new procedures is a sulfur-containing acid, which may be either sulfuric acid or a sulfonic acid. Examples of suitable aryl sulfonic acids include benzene, toluene, naphthalene, or para-butylphenol sulfonic acids. Also alkane sulfonic acids, such as petroleum oil sulfonic acids, may be used. Sulfuric acid is the preferred material, and it is desirable to employ a substantially concentrated sulfuric acid, such as the commercial 95% acid. However, less concentrated acid may be used.

The relative proportions of carbon to acid in the catalytic mixture may be varied. However, for best results, it has been found that mixtures containing about one part of the sulfur-containing acid for each one to 20 parts of activated carbon give the best esters with the greatest speed.

The quantity of the catalytic mixture of activated carbon and acid relative to the amounts of acid and alcohol used in the esterification reaction can be varied and will be dependent to some extent upon the particular acid and alcohol used in the process. Broadly, sufficient of the catalytic mixture is employed to produce a catalytic effect upon the condensation on the alcohol and acid to form the ester. However, best results have been obtained using between 0.1 and 5% by weight of the catalytic mixture in the esterification, i. e., between about 0.05 and 2.5% $H_2SO_4$ and about 0.05 and 4.5% activated carbon.

The ability of the new catalytic mixtures of this invention to form esters of high purity and freedom from discoloration seems to be general for all esterification procedures, which form impure or discolored esters when mineral acids, such as sulfuric or aryl sulfonic acids, are used as the catalysts. However, the invention is most usefully applied in the formation of high molecular weight esters, such as those formed from polycarboxylic acids, of molecular weight greater than 105 to give esters having a molecular weight between 120 and 400.

A large variety of different types of alcohols may be successfully used in carrying out the procedures of this invention. Examples of useful alcohols include:

(a) Monohydric alkyl alcohols, e. g., methanol; ethanol; n- or sec.-propanol; n-, sec.-, or tertiary butanol; n-, sec.-, or isoamyl alcohol; isooctyl alcohol; 2-ethylhexyl alcohol; nonyl alcohol; lauryl alcohol; stearyl alcohol and dodecanol;

(b) Dihydric alkyl alcohols, e. g., glycol; 1-3 propylene glycol; 1,4-butylene glycol; 1,6-hexamethylene glycol, and 1,8-octandiol;

(c) Higher polyhydric alkyl alcohols, e. g., glycerol; 1,3,4-butantriol; 1,2,6-hexantriol; pentaerythritol; pentaglycerol and sucrose;

(d) Phenols, e. g., phenol; cresols; chlorophenol; amylphenol; polychlorophenol; p-hydroxy biphenyl; betahydroxy naphthalene; 2-chloro-3-methyl phenyl; paranitrophenol and salicyl alcohol;

(e) Alicyclic alcohols, e. g., cyclohexanol, inosital; hydroxy benzene hexachloride; 2-methylcyclohexanol; cycloheptanol, and benzyl alcohol;

(f) Heterocyclic alcohols, e. g., furfuryl alcohol; tetrahydrofurfuryl alcohol; alpha, beta, or gamma-pyridone and carbostyril;

(g) Ether alcohols, e. g., diethylene glycol; diethylene glycol monomethyl ether; ethylene glycol monoethyl ether; tetraethylene glycol; butoxyethanol; pentanoxymethanol and butylene glycol monobutyl ether.

A large variety of carboxylic acids may be used in the esterification procedures of this invention. Examples of usable acids include:

(a) Aliphatic monocarboxylic acids, e. g., acetic; propionic; butyric; caproic; lauric; myristic; palmitic; stearic; pelargonic; ethyl butyric; ethyl hexanoic; and oleic acids.

(b) Aliphatic dicarboxylic acids, e. g., succinic; oxalic; suberic; azelaic; adipic; sebacic; maleic; glutaric and fumaric acids;

(c) Higher aliphatic polycarboxylic acids, e. g., citric; aconitic and tricarballylic;

(d) Aryl carboxylic acids; e. g., benzoic; phenylacetic; salicylate; 4-chlorobenzoic; O-, m-, or p-toluic; phthalic; naphthoic; 2-nitrobenzoic and pyromellitic acids;

(e) Alicyclic carboxylic acids, e. g., cyclohexanoic; 2-methyl cyclohexanoic; α-cyclohexyl butyric; 2-methyl cyclohexyl acetic; cyclohexyl succinic and benzene hexachloride acetic acids;

(f) Heterocyclic carboxylic acids, e. g., furoic; picolinic; nicotinic; lutidinic; cinchomeronic; and 2-methyl furoic acids;

(g) Miscellaneous acids, e. g., chloroacetic; abietic; tartaric; glycolic; levalinic and ricinoleic acids.

Where it is desired, the anhydride, if available, of any of these acids may be employed in place of the acid per se.

Using the above acids and alcohols in this invention, examples of esters of high molecular weight with substantial freedom from discoloration or presence of impurities which can be prepared include:

(a) Aliphatic monocarboxylic acid esters, e. g., butyl laurate; amyl laurate; glycerol monolaurate; butyl oleate; ethylhexyl oleate; benzyl stearate; cyclohexyl stearate; lauryl butyrate; glycerol tributyrate; dodecyl acetate; nonyl ethylhexanoate; sucrose octoacetate and tetrahydrofurfuryl oleate;

(b) Aliphatic dicarboxylic acid esters, e. g., diisooctyl adipate; dinonyl adipate; dinonyl azelate; diisooctyl sebacate; diethyl adipate; dimethoxymethyl adipate; bis-(methylcyclohexyl) adipate; dibenzyl sebacate; dibutyl succinate and dilauryl oxalate;

(c) Higher aliphatic polycarboxylic acid esters, e. g., triethyl citrate; tributyl tricarballylate; triamyl aconitate; and triphenyl citrate;

(d) Aryl carboxylic acid esters, e. g., lauryl benzoate; nonyl phenylacetate; octyl naphthoate; diethyl phthalate; tetraethyl pyromellitate and diamyl phthalate;

(e) Alicyclic carboxylic acid derivatives, e. g., lauryl 2-methylcyclohexanoate; tetrahydrofurfuryl cyclohexanoate; diamyl cyclohexylsuccinate and naphthyl cyclohexanoate;

(f) Heterocyclic carboxylic acid esters, e. g., lauryl furoate; phenyl nicotinate; myristyl picolinate; ethylhexyl picolinate and biphenyl furoate;

(g) Glycol derivative esters, e. g., ethylene glycol dipropionate; diethylene glycol diacetate; triethylene glycol di-2-ethylbutyrate; polyethylene glycol sebacate; tetraethylene glycol di-ethylhexoate; diethylene glycol ricinoleate; polyethylene glycol dilevulinate; ethylene glycol adipate; tetraethylene glycol azelate; tri-(ethylene glycol monoethyl ether) citrate; and ethylene glycol monoamyl ether ricinoleate.

The reaction conditions used in carrying out esterifications with my new catalytic mixtures can be varied and are primarily dependent upon the particular esters being formed. Thus, the temperatures will vary and depend primarily upon the alcohols used, but in any case, a temperature sufficient to cause the esterification to proceed in the presence of the catalytic mixtures should be used. Generally, temperatures between 50 and 200° C. will be employed.

No specific type of apparatus is required, and the general type of equipment normally used in esterification reactions can be utilized. Likewise, general information and knowledge regarding esterification reactions can be applied by those skilled in the art in carrying out the operations in accordance with this invention.

CONCLUSIONS

This present invention provides new catalytic mixtures for use in the liquid phase esterification of carboxylic acids with alcohols to form esters. The new catalysts which are used in the liquid phase with the reactants are generally applicable to the formation of all esters, but they are most effectively employed in the formation of esters of high molecular weight which generally produce discolored products when formed using mineral acids or sulfonic acids as the esterification catalysts. The usefulness of the new catalytic mixtures of this invention is primarily due to their ability to form esters at relatively high reaction rates, which are of very high purity and do not contain discolorizing ingredients.

I claim:

1. In the process for the production of esters, the step which comprises condensing a material from the group consisting of carboxylic acids and anhydrides thereof with an alcohol in the presence of between 0.1 and 5% by weight of a mixture of (1) a sulfur-containing acid from the group consisting of sulfuric and sulfonic acids, and (2) activated carbon.

2. A process for the production of substantially colorless low vapor pressure esters of carboxylic acids, which comprises adding between 0.05 and 2.5% by weight of $H_2SO_4$ and between 0.05 and 4.5% by weight of activated carbon to an esterification mixture, subjecting the mixture to a temperature sufficient to cause esterification and recovering an ester from the reaction mixture.

3. In the process for the production of high molecular weight esters having very good color characteristics, the improvement comprising carrying out the esterification using a mixture of sulfuric acid and activated carbon as the esterification catalyst.

4. A process as claimed in claim 3, wherein said mixture comprises one to 20 parts of activated carbon for each part of sulfuric acid.

5. A process as claimed in claim 1 wherein the condensation is carried out at a temperature between 50 and 200° C.

6. A process as claimed in claim 1, wherein said material is a dicarboxylic acid of the general formula:

$$HOOC(CH_2)_xCOOH$$

wherein $x$ is an integer from 2 to 10.

7. A process as claimed in claim 1, wherein said alcohol is a saturated monohydric alkyl alcohol having between one and 18 carbon atoms.

8. A process as claimed in claim 1, wherein said material is an aryl dicarboxylic acid.

9. A process as claimed in claim 8, wherein said material is phthalic anhydride.

10. A process as claimed in claim 1, wherein said carbon is of such fineness that at least 85 to 95% will pass a 325 mesh standard sieve.

11. A process as claimed in claim 1, wherein a mixture of alcohols is used.

12. In the process for the production of esters, the step which comprises condensing a material from the group consisting of carboxylic acids and anhydrides thereof with an alcohol in the presence of a catalyst comprising a mixture of (1) a sulfur-containing acid from the group consisting of sulfuric and sulfonic acids, and (2) activated carbon.

ANTHONY J. BRUNO, Jr.

No references cited.